(12) United States Patent
Brohan et al.

(10) Patent No.: US 7,723,610 B2
(45) Date of Patent: May 25, 2010

(54) TITANIUM OXIDE-BASED SOL-GEL POLYMER

(75) Inventors: Luc Brohan, La Chapelle-sur-Erdre (FR); Hari Sutrisno, Tulungagung (ID); Yves Piffard, La Chapelle-sur-Erdre (FR); Maria Teresa Caldes-Rouillon, Nantes (FR); Olivier Joubert, Brains (FR); Eric Puzenat, Nantes (FR); Annabelle Rouet, Nantes (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 0 days.

(21) Appl. No.: 12/406,760

(22) Filed: Mar. 18, 2009

(65) Prior Publication Data

US 2009/0173383 A1 Jul. 9, 2009

Related U.S. Application Data

(62) Division of application No. 10/502,399, filed as application No. PCT/FR03/00106 on Jan. 14, 2003, now Pat. No. 7,524,482.

(30) Foreign Application Priority Data

Jan. 29, 2002 (FR) .................................. 02 01055

(51) Int. Cl.
*C01G 25/02* (2006.01)
*C01G 27/02* (2006.01)
*C04B 35/00* (2006.01)
*H01L 35/00* (2006.01)
*H01B 1/02* (2006.01)
*H01M 6/30* (2006.01)

(52) U.S. Cl. ...................... 136/263; 501/95.2; 136/252; 252/520.22; 429/111; 423/608

(58) Field of Classification Search ................. 423/579, 423/592.1, 608–616; 501/95.2; 136/252–265; 429/111, 44; 252/520.22
See application file for complete search history.

(56) References Cited

U.S. PATENT DOCUMENTS 4,367,280 A 1/1983 Kondo et al.

(Continued)

FOREIGN PATENT DOCUMENTS

JP 57-190645 A 11/1982

OTHER PUBLICATIONS

Caruso et al., "Titanium Dioxide Tubes from Sol-Gel Coating of Electrospun Polymer Fibers", Adv. Mater. 2001, 13, No. 20, 1577-1579.*

(Continued)

*Primary Examiner*—Steven Bos
*Assistant Examiner*—Anthony J Zimmer
(74) *Attorney, Agent, or Firm*—Buchanan Ingersoll & Rooney PC

(57) ABSTRACT

The invention relates to a titanium oxide-based polymer composition. The inventive composition comprises a $TiO_x(OH)_y(H_2O)_z$ (x+y–+z=3) titanium oxide-based polymer in the form of a gel or sol. Said polymer, which has a one-dimensional (1D) structure, is made from concentrically-wound fibers having a periodicity which is deduced from the spacing between said fibers, of between 3.5 Å and 4 Å. Each fiber comprises $TiO_6$ octahedrons and each $TiO_6$ octahedron shares two opposite edges with two adjacent octahedrons (2.times.2.92 Å) in order to form infinite chains which develop along the axis of a fiber. According to the invention, two adjacent chains form double lines as a result of the shared edges (2.times.3.27 Å). The inventive polymer is suitable for use as a photosensitive element in a photovoltaic cell, such as a sunscreen for a window.

5 Claims, 7 Drawing Sheets

U.S. PATENT DOCUMENTS 5,316,854 A     5/1994    Lin et al.
5,350,644 A     9/1994    Graetzel et al.
5,403,513 A     4/1995    Sato et al.

OTHER PUBLICATIONS

Kallala et al. "Structures of inorganic polymers in sol-gel processes based on titanium oxide", Physical Review E 44 (5), Nov. 1993, 48-.*

Z. Wang et al., *Functional and Smart Materials—Structural Evolution and Structure Analysis*, 1998, pp. 77-78, Plenum Press, NY.

Yang et al., "Study of stability of sol-gel solutions," *Journal of Guilin University of Technology*, 1999, pp. 371-374, vol. 19(4), Chemical Abstracts database accession No. 132:199483 XP002216420.

Zheng et al., "Studies on preparation and properties of Ti02/PVP nano-composites by sol-gel method," *Jinshu Xuebao*, 1999, pp. 1224-1228, vol. 35(11), Chemical Abstracts database accession No. 132:140878 XP002216421.

Fu et al., "Preparation of monolithic TiO2 gel in presence of N,N-dimethylformamide," *Gongneng Cailiao*, 2001, pp. 319-320, vol. 32(3), Chemical Abstracts accession No. 135:347833 XP002216419.

* cited by examiner (A)

- Ti
- O
- OH (B)

TITANIUM OXIDE-BASED SOL-GEL POLYMER

CROSS REFERENCE TO RELATED APPLICATION

The present application is a division of U.S. patent application Ser. No. 10/502,399 filed Mar. 25, 2005, which is a national stage filing of International Patent Application No. PCT/FR2003/00106 filed Jan. 14, 2003, which claims the priority of French Patent Application No. 02/01055 filed Jan. 29, 2002, the entire contents of which are incorporated herein by reference, the entire contents of which are incorporated herein by reference.

BACKGROUND OF THE INVENTION

1. Field of the Invention

The present invention relates to a polymer composition based on titanium oxide, to its use as a semiconductor element in a photovoltaic cell, and to a method for preparing it.

2. Description of the Related Art

Photovoltaic cells convert solar energy into electricity by exploiting the photovoltaic effect that exists at the interface of a p-n junction between two semiconductors. Semiconductors based on silicon have been used, but the high cost of the raw material is not favorable to the industrial development of such cells. Silicon has therefore been replaced with titanium oxide $TiO_2$ which is an inexpensive semiconductor and has stable photocatalytic properties. Its applications in the photovoltaic field are, however, limited, as it absorbs only within a narrow range of the solar spectrum, owing to a wide bandgap. This range corresponds to the UV part and covers less than 10% of the entire solar spectrum. One solution consists in covering the surface of the titanium oxide with a photosensitizer in order to extend its photoactivity range into the region of the solar spectrum. This technique has been employed using a ruthenium polypyridinic complex as photosensitizer (U.S. Pat. No. 5,084,365) and it has allowed efficiencies of around 12% to be achieved. The cells containing, as semiconductor, titanium oxide activated by a photosensitizer have a production cost less than that of the photovoltaic cells of the prior art. However, their operating lifetime, which is about 10 years, is considerably shorter than that of single-crystal silicon cells (which is around 20 years), and their efficiency is lower.

SUMMARY OF THE INVENTION

The inventors have now found that the performance of a titanium oxide used as semiconductor in a photovoltaic cell can be optimized by controlling the microstructural or mesostructural scale of the morphology. The object of the present invention is therefore to provide a particular titanium oxide exhibiting improved performance when it is used as semiconductor element in a photovoltaic cell.

The subject of the present invention is therefore a composition based on titanium oxide, a method for preparing it and a photovoltaic cell that contains it as semiconductor element.

DETAILED DESCRIPTION OF THE PREFERRED EMBODIMENTS

Figure 1:
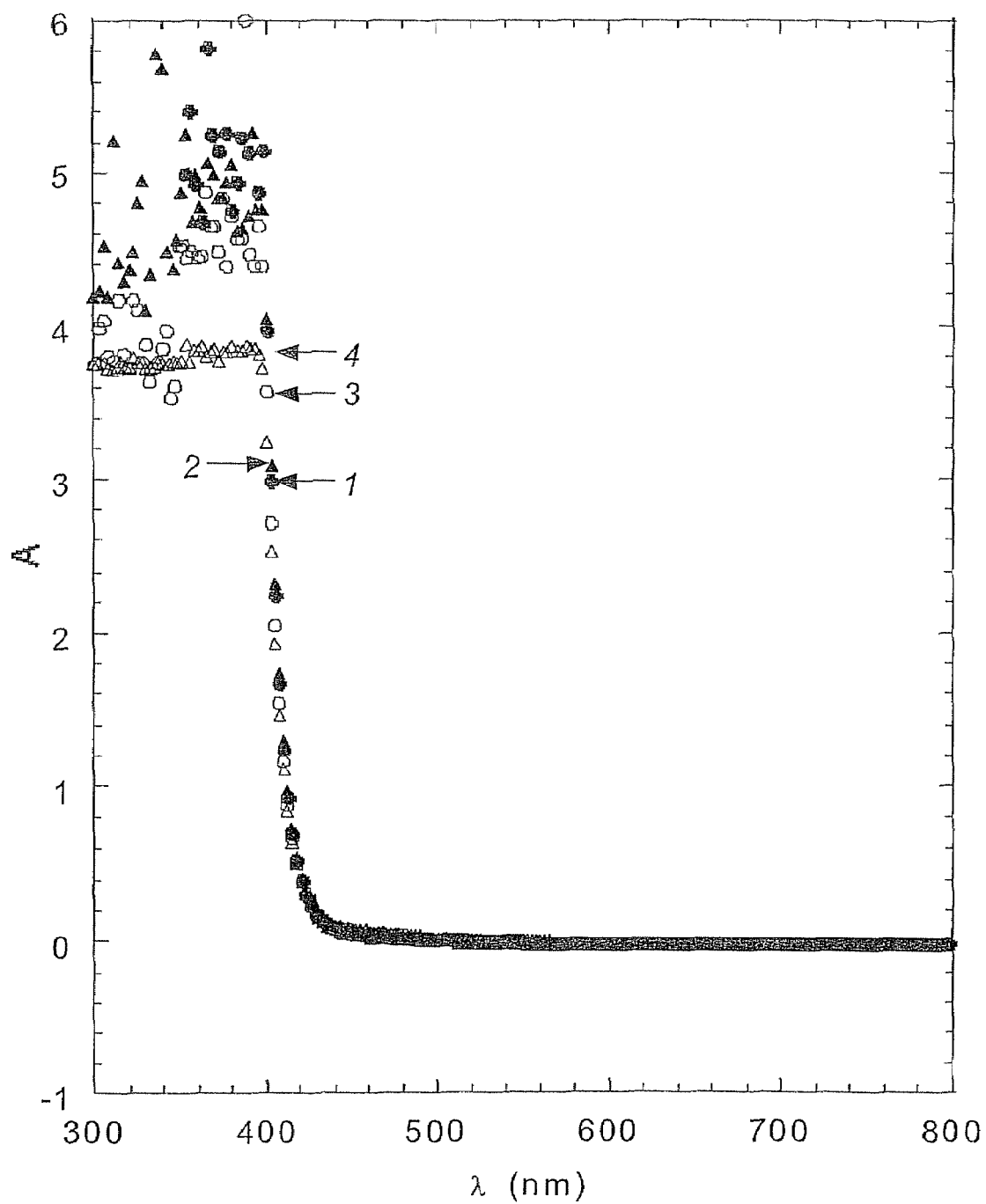
FIG. 1 shows the optical absorption spectrum of the untreated fraction of solutions 1 to 4.

The composition according to the present invention is essentially formed by a polymer based on titanium oxide, which may be represented by the formula $TiO_x(OH)_y(H_2O)_z$ in which $x+y+z=3$, in the form of a gel or in the form of a sol. It is characterized in that:

the polymer has a structure of one-dimensional (1D) character and it consists of fibers wound concentrically with a periodicity, deduced from the space in between the fibers, of between 3.5 Å and 4 Å;

each fiber is made up of $TiO_6$ octahedra;

each $TiO_6$ octahedron shares two opposed edges with two adjacent octahedra (2×2.92 Å) in order to form infinite chains that grow along the axis of a fiber; and two adjacent chains form double strands by the commoning of edges (2×3.27 Å).

The one-dimensional structure of the $TiO_x(OH)_y(H_2O)_z$ polymer (denoted hereafter by TiO polymer) is detected by transmission electron microscopy. The chain structure is revealed by EXAFS analysis (Extended X-ray Absorption Fine Structure).

A polymer composition according to the invention (denoted hereafter by polymer TiO composition) may be translucent or be colored. The composition is translucent when it is shielded from the light and when the titanium is essentially in the $Ti^{4+}$ form, the polymer then corresponding to the formula $TiO(OH)_2$. When the titanium is essentially in the $Ti^{3+}$ form in the TiO polymer, a broad absorption band exists in the visible range (between 400 and 850 nm), which results in a violet, blue, midnight blue or green coloration of the composition. The coloration changes with the proportion of $Ti^{3+}$. It goes from green, in the case of low $Ti^{3+}$ concentrations to blue in the case of high concentrations. When all the titanium is in the $Ti^{3+}$ form, the TiO polymer corresponds to the formula $TiO(OH)(H_2O)$.

A TiO polymer composition according to the invention may be obtained from $TiOCl_2$. Since the $TiOCl_2$ compound is highly hydroscopic, it is used in the $TiOCl_2.yHCl$ form, i.e. in solution, dissolved in concentrated hydrochloric acid. Advantageously, the concentrated HCL solution is an approximately 2M aqueous solution. The $TiOCl_2$ concentration in this solution is preferably between 4M and 5M.

According to a first embodiment, the TiO polymer composition according to the invention may be obtained in oxidized form, in which the titanium is in the $Ti^{4+}$ oxidation state, by a method that consists in:

preparing a $TiOCl_2$ solution in dimethylformamide (DMF) by introducing $TiOCl_2.yHCl$ into DMF, in proportions such that the concentration ($C_{Ti}$) of Ti atoms is less than 2M;

heating the solution thus obtained to a temperature between room temperature and 90° C.; and holding the solution at this temperature for a certain time.

The temperature hold time depends on the temperature. For example, when the solution is held at 65° C., a time of 24 h is sufficient.

The $TiO(OH)_2$ polymer thus obtained may be converted into its reduced form in which at least part of the titanium is in the $Ti^{3+}$ oxidation state, by UV irradiation (for example at $\lambda=360$ nm) of the composition in an inert atmosphere, which induces a coloration (violet, blue or green, depending on the $Ti^{3+}$ concentration), this coloration being maintained when the irradiation ceases.

The TiO polymer composition is obtained in the form of a colloidal solution or sol in DMF when $C_{Ti}$ is less than 1M and in the form of a gel when $C_{Ti}$ is greater than 1M.

In a second embodiment, the TiO polymer composition of the invention is obtained directly in reduced form, in which at least a part of the titanium is in the $Ti^{3+}$ oxidation state by a method consisting in reducing $TiOCl_2$ using a species that is oxidizable at a potential of less than $-0.05$ V with respect to a standard hydrogen electrode. As an example, mention may be made of metals in oxidation state zero, such as Ni, Fe, Al, Cr, Zr, Ti, Nb, Cs, Rb, Na, K, Li, La and Ce, ionic compounds, in which the cation is chosen from $V^{2+}$, $Ti^{2+}$ and $Cr^{2+}$, and ionic compounds in which the anion is chosen from $S_2O_3^{2-}$, $H^-$, and $S_2^{2-}$. Zinc is particularly preferred. In this case, the TiO polymer composition according to the invention is obtained with a coloration. If it is then irradiated by UV radiation, the content of $Ti^{3+}$ species increases and its coloration changes from green to violet and then to blue as the content of $Ti^{3+}$ ions increases.

A first variant of the method of preparation involving reduction by an oxidizable species, consists in preparing a $TiOCl_2$ solution in dimethylformamide (DMF) starting with $TiOCl_2.yHCl$, such that the concentration ($C_{Ti}$) of Ti atoms is less than 2M, in adding the oxidizable species, in heating the solution to a temperature between room temperature and 90° C. and in holding the solution at this temperature for a certain time, which depends on the temperature.

A second variant of the method of preparation, involving reduction by an oxidizable species, consists in introducing the oxidizable species into a $TiOCl_2.yHCl$ solution in which $C_{Ti}$ is less than 2M, and in maintaining the reaction mixture at a temperature between room temperature and 90° C.

In both variants, it is preferred to introduce the metal in the form of chips. The ionic compound may be introduced in the form of powder, liquid or gas.

When a composition according to the invention is prepared by a method using DMF, it contains dimethylammonium chloride and formic acid. These constituents may be detected for example by proton ($^1H$) NMR analysis, which also makes it possible to determine the quantity thereof. When the $C_{Ti}$ concentration in the initial reaction mixture is less than 1M, the composition is a colloidal solution of uncrosslinked polymer in DMF. When the initial concentration $C_{Ti}$ is greater than 1M, the polymer is crosslinked and the composition is in gel form.

When a composition according to the invention is prepared according to the second variant of the method involving reduction by an oxidizable species, i.e. in the absence of DMF, said composition is a colloidal solution of uncrosslinked polymer in water when $C_{Ti}$ is less than 1M. When $C_{Ti}$ is greater than 1M, the polymer is crosslinked and the composition is in gel form.

Whatever the method used to obtain the reduced form of the polymer exhibiting coloration, the oxidized form may be obtained by subjecting the polymer composition to oxidation in air so that it resumes its translucent appearance.

A TiO polymer composition according to the invention is photochromic in character. When it is obtained in gel form, it may advantageously be used in a photovoltaic cell in which the active material of the photoanode is the composition containing the $Ti^{3+}$ reduced form, and the active material of the photocathode is a composition containing the $Ti^{4+}$ oxidized form.

A composition of the invention may furthermore be used for the production of solar protection glazing. A glass pane covered with a composition of the invention in the form of a gel remains translucent when it is away from sunlight. Under the effect of irradiation by visible light, the glass pane assumes a midnight blue coloration. This phenomenon can be made reversible by applying a potential allowing oxidation.

The present invention will be described in greater detail by the following examples, which are given for illustration, but the invention is not, however, limited thereto.

EXAMPLE 1

10 ml of DMF at 4 ml of a 4.3M $TiOCl_2$ solution in 2M hydrochloric acid were introduced into a test tube, under an inert atmosphere of $N_2$. After having closed the tube, it was placed in an oven at 65° C. and maintained at this temperature for 24 hours. It was then left to cool down and the appearance of a transparent gel was observed at room temperature.

The presence of dimethylammonium chloride and formic acid was detected by $^1H$ and $^{13}C$ NMR by IR and by Raman.

After having been exposed to visible light, the gel had an intense blue coloration, as a result of the reduction of $Ti^{4+}$ to $Ti^{3+}$. This phenomenon is reversible, and by opening the tube an oxidation takes place in the presence of the oxygen from the air, the gel again becoming transparent after a few minutes.

High-resolution imaging, obtained by transmission electron microscopy, showed that the structure of the $TiO(OH)_2$ polymer obtained was of 1-dimensional (1D) character. The fibers of the polymer were wound concentrically in the manner of a cotton bol. The presence of substantial disorder in the direction perpendicular to the stack of fibers was manifested in the diffraction pattern by the presence of diffuse lenticular spots. The periodicity, deduced from the spacing between the fibers, was estimated to be 3.5-4 Å.

EXAMPLE 2

The operating method described in example 1 was repeated, for several preparations, varying only the concentration $C_{Ti}$ in the test tube. Each test tube, filled with air or $N_2$ was subjected to a heat treatment similar to that of example 1.

The formation of a gel was observed only for $C_{Ti}$ concentrations between 1M and 2M. For concentrations where $C_{Ti}<1M$, the mixture remained liquid and consisted of a colloidal solution of the polymer. For concentrations where $C_{Ti}>2M$, an opaque white product forms that contains a transparent polymeric phase and an amorphous white precipitate, or a white precipitate of anatase in the case of very high concentrations.

EXAMPLE 3

The optical properties of various specimens were measured for various irradiation states. For this purpose, four specimens were prepared, in air or in nitrogen, from a $TiOCl_2$ solution identical to that used in example 1:

| No. | $C_{Ti}$ (mol/l) | Vol. of TiOCl$_2$ | Vol. of DMF | O$_2$ | N$_2$ |
|-----|------------------|-------------------|-------------|-------|-------|
| 1   | 1.6M             | 1.3 ml            | 2.15 ml     | X     |       |
| 2   | 1.6M             | 1.3 ml            | 2.15 ml     |       | X     |
| 3   | 1.45M            | 1.1 ml            | 2.15 ml     | X     |       |
| 4   | 1.45M            | 1.1 ml            | 2.15 ml     |       | X     |

In a first series of tests, a fraction of each of solutions 1 to 4 was subjected to UV irradiation (λ=360 nm) for 180 hours.

In a second series of tests, a fraction of each of solutions 1 to 4 was subjected to a heat treatment at 65° C. for 15 hours, after which each fraction was subjected to UV irradiation (λ=360 nm) for 180 hours.

FIGS. 1 to 4 show the optical absorption spectra of the solutions after various treatments. The absorption A, in arbitrary units, is plotted on the Y-axis. The wavelength λ, in nanometers, is plotted on the X-axis. In each of the figures, the solution spectra are indicated by the following symbols:

| Solution 1 | Solution 2 | Solution 3 | Solution 4 |
|------------|------------|------------|------------|
| ●          | ▲          | ○          | Δ          |

FIG. 1 shows the optical absorption spectrum of the untreated fraction of each of solutions 1 to 4. The four spectra are almost identical and show that there is no absorption in the visible range and that the influence of both the concentration and the conditioning atmosphere is negligible.

Figure 2:
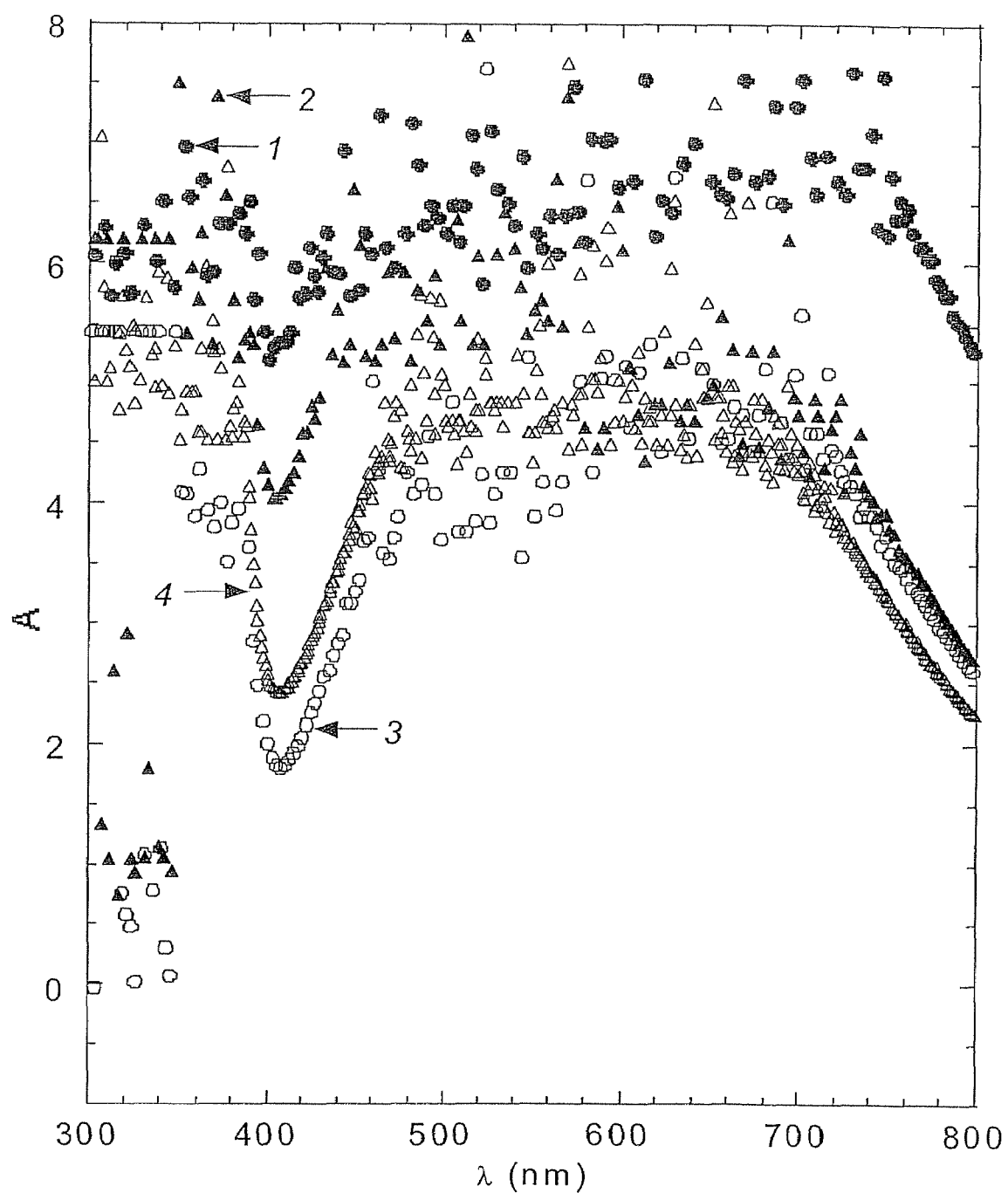
FIG. 2 shows the optical absorption spectrum of the fraction of each of solutions 1 to 4 subjected to UV irradiation for 180 hours.

FIG. 2 shows the optical absorption spectrum of the fraction of each of solutions 1 to 4 subjected to UV irradiation for 180 hours. The spectra indicate the presence of a strong absorption, which extends over a wide range in the visible, and also a slight shift of the absorption edge toward shorter wavelengths.

Figure 3:
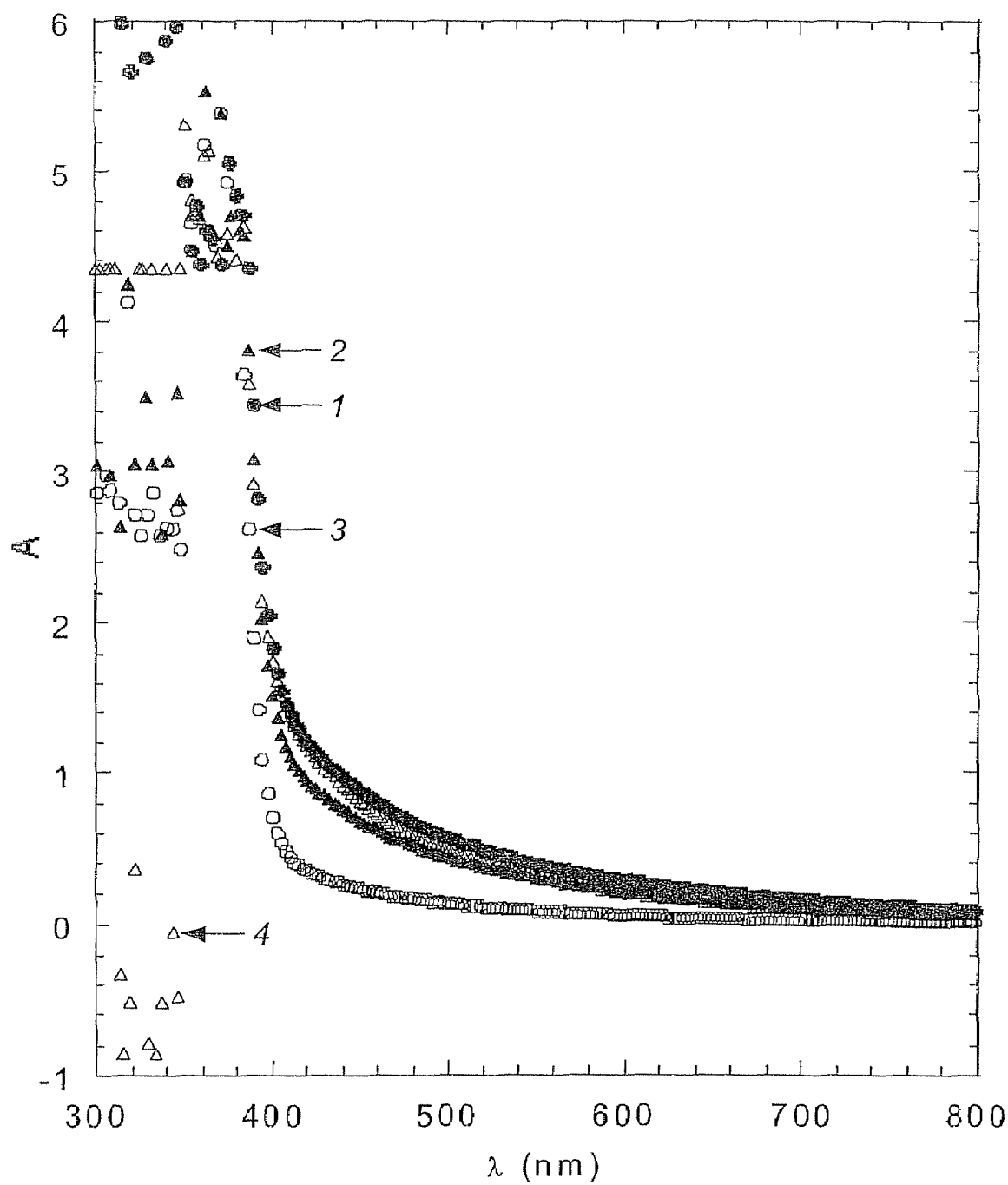
FIG. 3 shows the optical absorption spectrum of the fraction of solutions 1 to 4 subjected to heating at 65° C. for 15 hours.

FIG. 3 shows the optical absorption spectrum of the fraction of each of solutions 1 to 4 subjected to heating at 65° C. for 15 hours. The spectra indicate a slight shift of the absorption edge toward shorter wavelengths relative to the spectra of the initial, untreated solutions.

Figure 4:
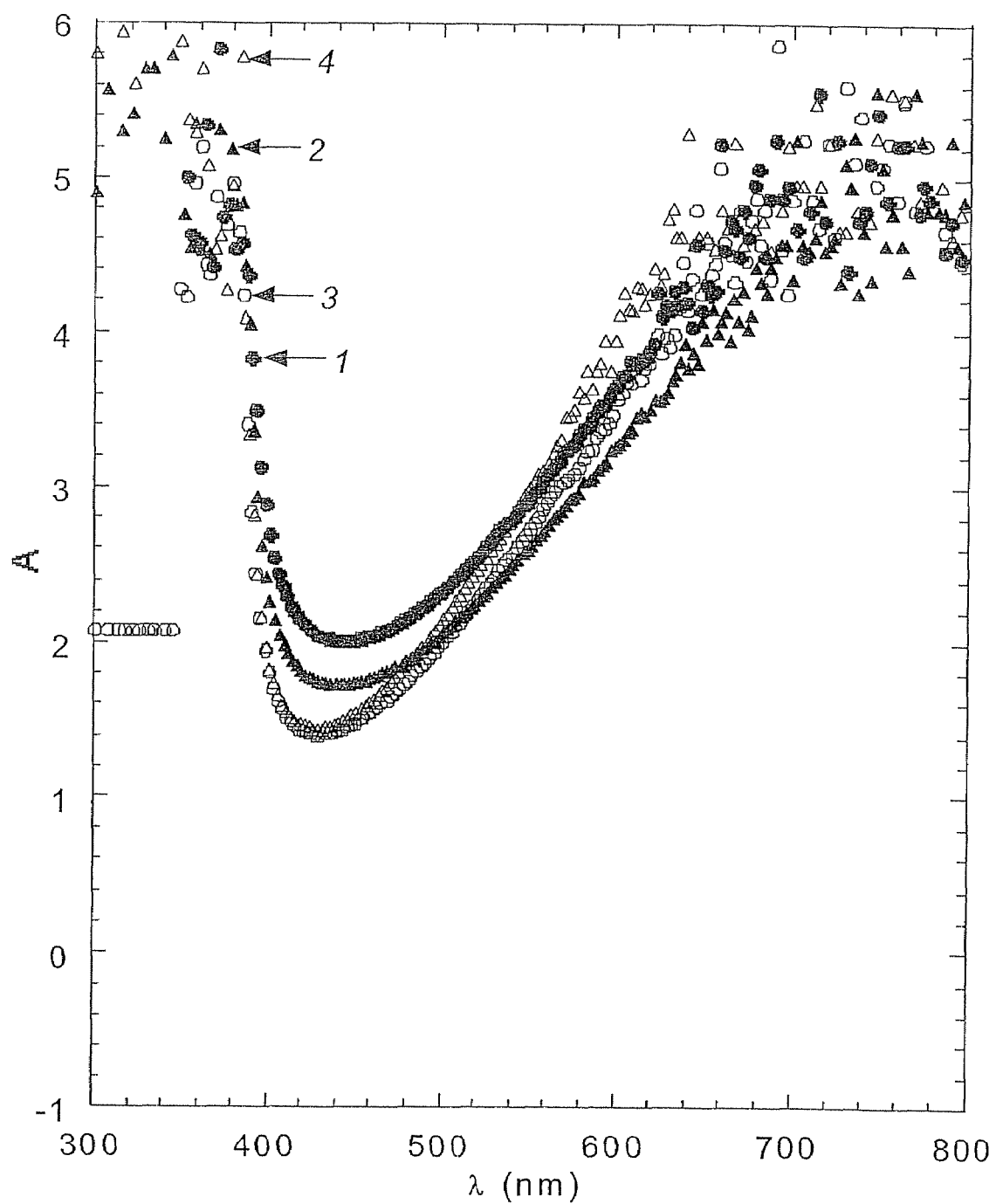
FIG. 4 shows the optical absorption spectrum of the fraction of solutions 1 to 4 subjected to heating at 65° C. for 15 hours followed by UV irradiation for 15 hours.

FIG. 4 shows the optical absorption spectrum of the fraction of each of solutions 1 to 4 subjected to heating at 65° C. for 15 hours followed by UV irradiation for 15 hours. The spectra indicate a broad absorption band in the visible range. The absorption is greater in the case of the gel and its maximum is shifted toward longer wavelengths than in the case of the corresponding initial solutions.

The structure of the TiO(OH)$_2$ polymer gel was characterized by titanium K-edge EXAFS analysis. The results of the fine structure analysis give the number N of neighboring atoms, the distance R between an absorbent atom and its neighbors, the Debye-Waller factor sigma., the energy shift $\Delta E_o$ and the residue ρ. The results are given in the table below.

| TiO(OH)$_2$ | N    | R (Å) | $\Sigma \times 10^2$ (Å) | $\Delta E_O$ (eV) | P (%) |
|-------------|------|-------|--------------------------|-------------------|-------|
| Ti—O        | 3.91 | 1.89  | 1.3                      | 0.48              |       |
| Ti—O        | 2.08 | 1.98  | 2.8                      | 0.00              | 2.32  |
| Ti—Ti       | 2.28 | 2.92  | 6.3                      | 2.84              |       |
| Ti—Ti       | 1.71 | 3.27  | 1.7                      | 6.85              |       |

Figure 5:
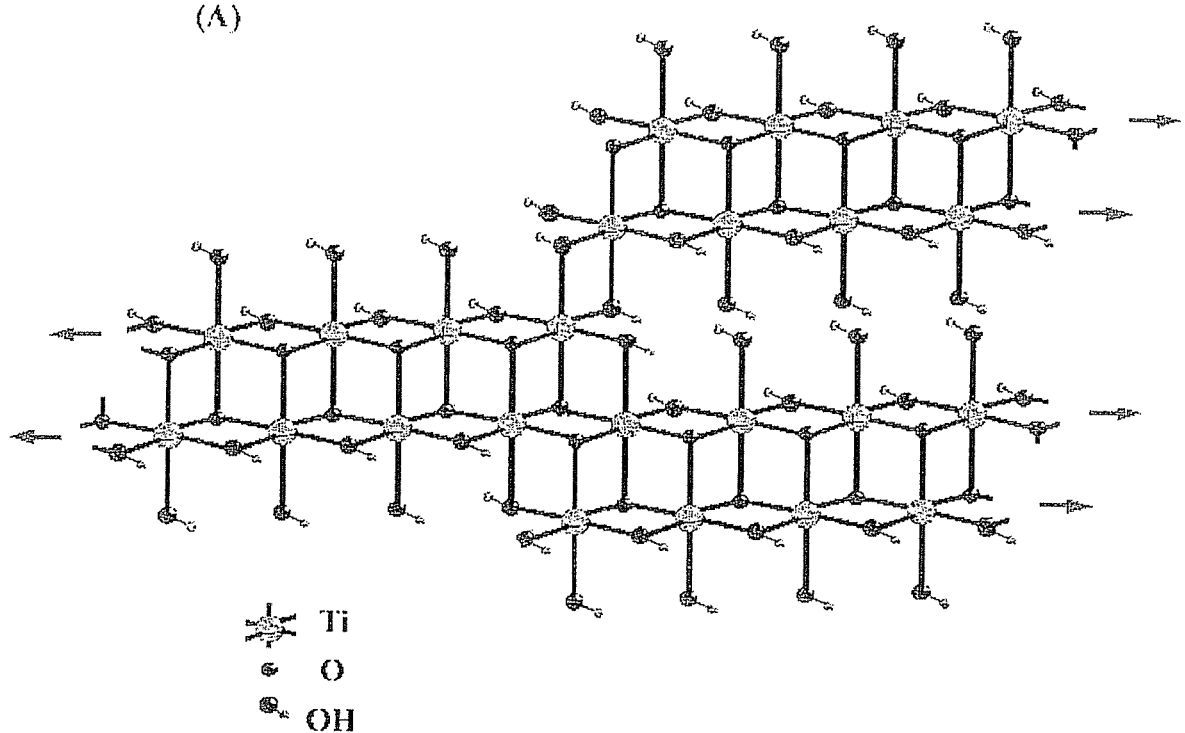
FIG. 5 shows the idealized structure of a $TiO(OH)_2$ polymer ribbon.
Figure 5:
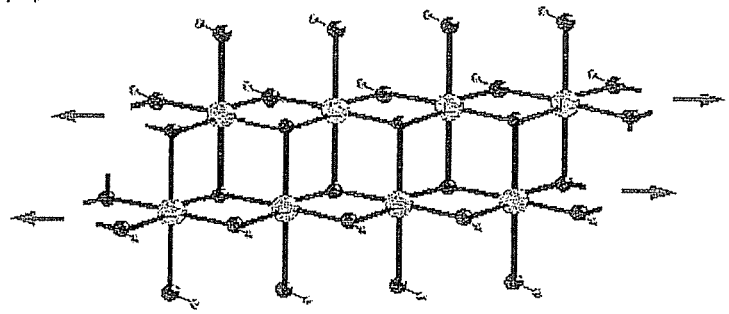

The idealized structure of the TiO(OH)$_2$ polymer ribbon, which has a 1D character, is shown in FIG. 5(B). It is similar to the structure observed in the case of hollandite. Each TiO$_6$ octahedron shares two opposed edges with two adjacent octahedra (2.92 Å) in order to form infinite chains that run along the axis of the fiber. Two adjacent chains form double strands by commoning edges (2×3.27 Å). Because of the difference between the actual number of neighbors and the ideal value of 2, the polymer obtained may be crosslinked, as shown in FIG. 5(A).

EXAMPLE 4

Four starting solutions were prepared by introducing a TiOCl$_2$ solution in concentrated HCl into DMF, in an amount such that the $C_{Ti}$ concentrations were 0.03M, 0.04M, 0.05M and 0.06M respectively. 100 mg of zinc chips were added to 3 ml of each of these solutions.

Figure 6:
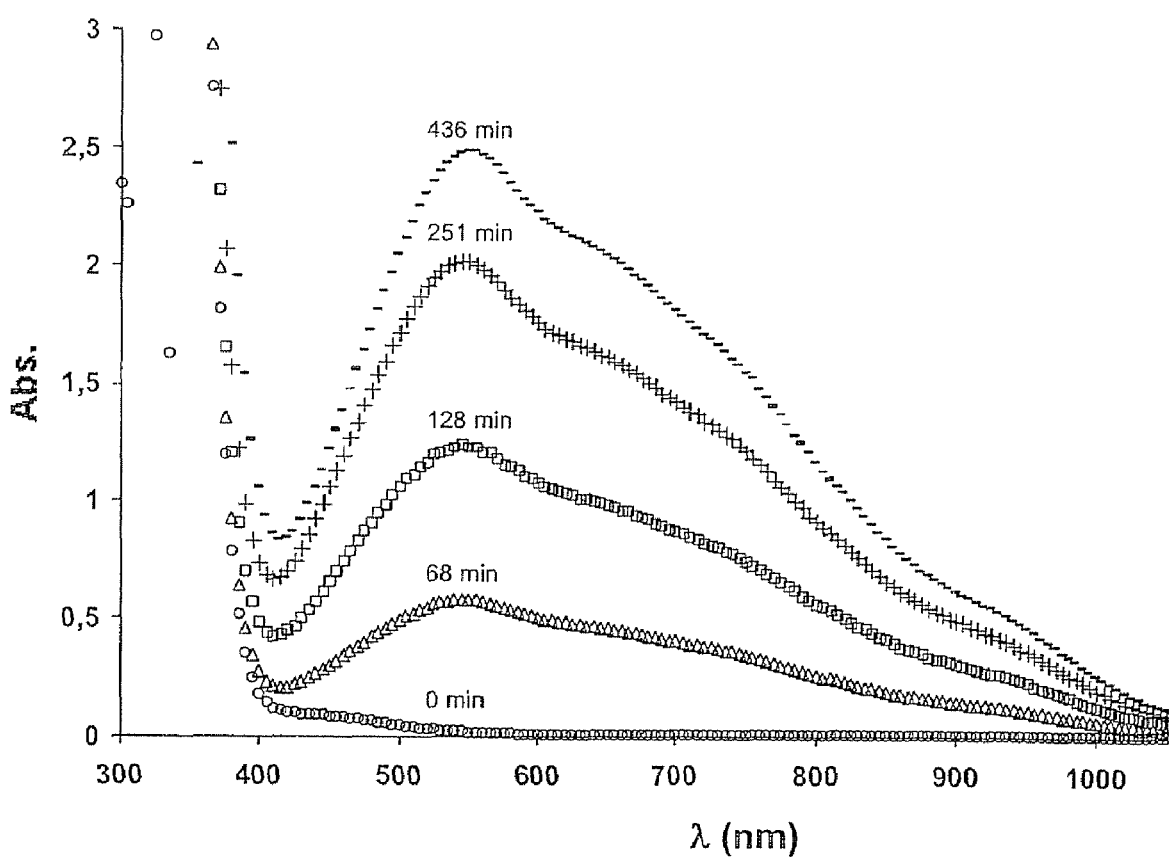
FIG. 6 shows an absorption spectrum for a specimen using a Cary UV-Vis-NR absorption spectrometer.
Figure 7:
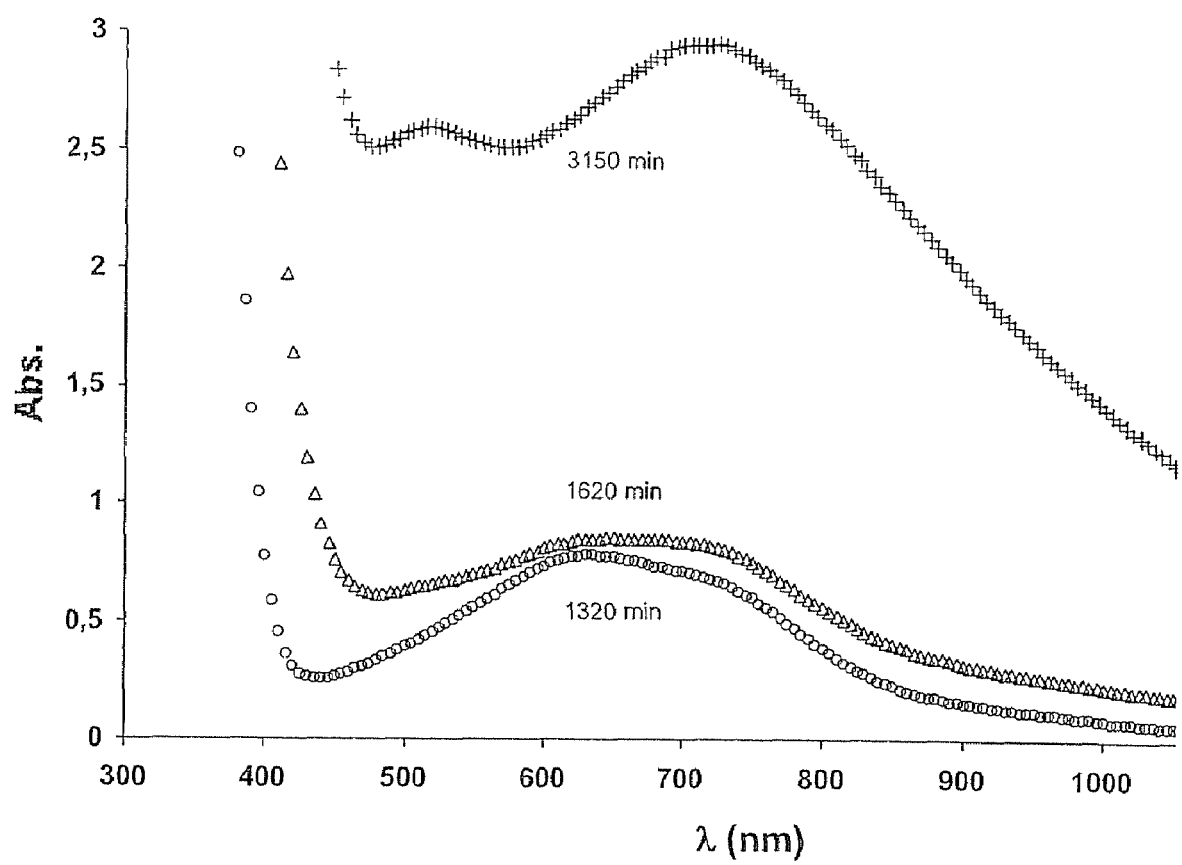
FIG. 7 shows an absorption spectrum for a specimen using a Cary UV-Vis-NR absorption spectrometer.

The change in coloration was monitored over time by measuring the absorption of the specimens using a Cary UV-Vis-NIR absorption spectrometer between 300 and 1200 nm. The absorption spectra are shown in FIGS. 6 and 7. The absorption Abs. is plotted on the Y-axis (in arbitrary units). The wavelength λ is plotted on the X-axis (in nm). The spectra show that, between t=0 min and t=500 min (FIG. 6), an absorption peak is formed at 550 nm, which increases over time and is accompanied by three shoulders, at 630 nm, at 740 nm and at about 900 nm. After 500 min (FIG. 7), this peak tends to disappear and leaves instead a broad absorption band lying between 630 and 740 nm. After 3150 min, i.e. more than 2 days, there is substantial absorption whatever the wavelength in the visible range. However, two peaks appear at 550 nm and 710 nm.

The invention claimed is:

1. A polymer composition essentially formed by a polymer based on titanium oxide, which is represented by the formula TiO$_x$(OH)$_y$(H$_2$O)$_z$ in which x+y+z=3, in the form of a gel or in the form of a sol, wherein:
    the polymer comprises fibers wound concentrically with a periodicity, deduced from the space in between the fibers, of between 3.5 Å and 4 Å;
    each fiber is made up of TiO$_6$ octahedra;
    each TiO$_6$ octahedron shares two opposed edges with two adjacent octahedra in order to form chains that grow along the axis of a fiber;
    two adjacent chains form double strands by the communing of edges; and
    the polymer composition comprises dimethylammonium chloride (DMAC1) and formic acid.

2. The polymer composition of claim 1, wherein the polymer composition is translucent and contains titanium in oxidized form Ti$^{4+}$.

3. The polymer composition of claim 1, wherein the polymer composition has a violet, blue or green coloration and at least part of the titanium of the polymer is in Ti$^{3+}$ form.

4. A photovoltaic cell comprising a photoanode and a photocathode in an electrolyte, wherein:
    the photoanode comprises a conductive glass plate coated with a layer of the polymer composition of claim 1 in gel form, containing titanium in Ti$^{3+}$ form; and
    the photocathode comprises a conductive glass plate coated with a layer of the polymer composition of claim 1 in gel form containing titanium in Ti$^{4+}$ form.

5. Solar protection glazing, wherein the solar protection glazing comprises a glass plate covered with a layer of the polymer composition of claim 1 in the form of a gel.

* * * * *